*INVENTOR.*
J.E. LOONEY
BY
*P. M. McKnight*

Patented July 17, 1951

2,561,028

UNITED STATES PATENT OFFICE 2,561,028

VALVE

Jim E. Looney, Tulsa, Okla.

Application December 22, 1945, Serial No. 636,744

1 Claim. (Cl. 251—113)

This invention relates to improvements in valves and more particularly, but not by way of limitation, for valves adapted for flow lines flowing high pressure petroleum fluids such as, 100 octane gasoline, propane, butane and the like.

An important object of this invention is to provide a valve having a cut away cone portion in order to maintain an even flow without a pressure drop through the valve.

Another object of this invention is to provide a valve for high pressure petroleum fluids capable of maintaining an efficient and tight seal while utilizing an acid resisting alloy coating bonded to the alloy steel valve body and valve cone in order to resist erosion and corrosion.

And still another object of this invention is to provide a valve construction wherein the valve cone is maintained in tight relation with the body seat by means of a ball bearing race cooperating with an adjusting stud to eliminate the possibility of leaks yet allowing easy opening and closing of the valve under high pressure conditions.

And another object of this invention is to provide a valve which is simple in construction, durable, and ample in operation.

With the foregoing outlined and with other objects in view which will appear as the description proceeds, the invention consists in the novel features hereinafter described in detail, illustrated in the accompanying drawings, and more particularly pointed out in the appended claim.

Figure 1:
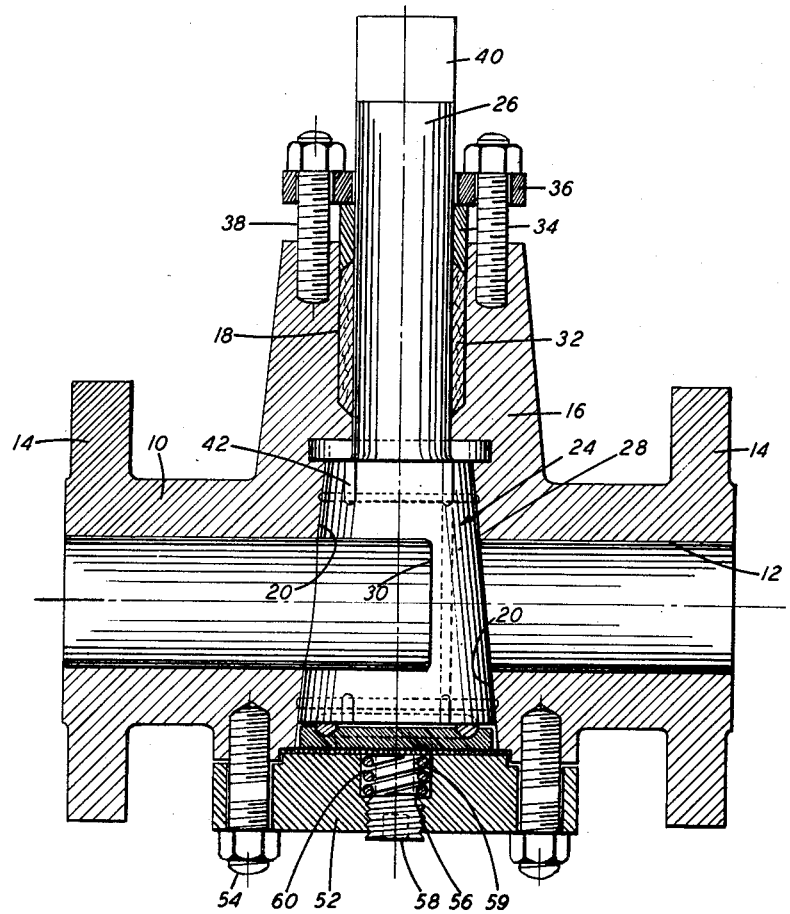
Fig. 1 is a sectional elevational view of the improved valve shown in closed position.
Figure 2:
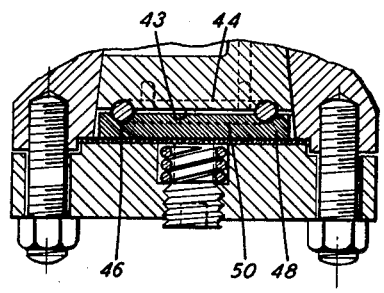
Fig. 2 is a detailed view with certain parts broken away showing the ball bearing race.

Referring to the drawings in detail, reference character 10 designates the valve body having a fluid passageway 12 and the usual flanges 14 for connection with a flow line (not shown). The body 10 comprises an upper tapered portion 16 having an aperture or bore 18, a portion of which is tapered at 20, to provide a valve cone seat. The valve cone 24 comprises a cylindrical stem 26 extending into a frusto-conical portion 28 adapted to cooperate with the tapered valve seat 20. A portion of the cone 24 is cut away at 30 to provide a transverse recess so that an even flow through the passageway 12 is assured without any drop in fluid pressure through the valve.

A packing gland 32 is disposed in the bore 18 and surrounds the stem 26. The packing 32 is secured by a beveled ring 34 in turn held in position by a valve bonnet 36 secured to the body portion 16 by means of the threaded studs 38. The upper portion 40 of the stem 26 is of irregular configuration for receiving a wrench or similar tool to open and close the valve. A plurality of lubrication channels 42 are provided in the cone 24 and receive lubricant from a channel (not shown) provided in the body 10.

The bottom or lower face 43 of the frusto-conical member 28 is provided with a circular groove 44 adapted to receive a plurality of loose disposed ball bearings 46. A circular plate 48 has a cooperating race or groove 50 and is disposed adjacent the face 43. The plate is of substantially the same diameter as the lower portion of the cone 28, but may vary in thickness in order that the groove 50 will be commensurate with the groove 44. The plate 48 is held in position by a cover plate 52 secured to the body 10 by the threaded studs 54. The cover plate is provided with an aperture 56 of different diameters, one portion of which is threaded to receive a partially threaded adjusting stud 58. A helical spring 59 is anchored in the unthreaded portion 60 of the aperture 56 and bears against the plate 48. The spring 59 surrounds the unthreaded portion of the stud 58 and is adapted to hold the ball bearings in position during an adjustment of cone 28 by the stud 58. The ball bearings 46 assure an easy operation in opening and closing the valve cone 28 under high pressures, however, the adjusting stud 58 maintains the ball bearings in tight relationship against the cone 28 which in turn will maintain the cone 28 in a tighter sealing relation with the seating surface 20 of the valve body 10, thereby assuring against leakage.

The seating surface 20 of the body 10 and the outer periphery of the cone 28 are provided with an alloy coating material bonded thereto by welding and will resist any acid condition present in the fluid as well as prevent erosion or corrosion of the working parts. The alloy coating which is preferable but not limited thereto consists of the following ingredients in percentages.

| | |
|---|---|
| Nickel | 65 |
| Molychrome steel | 30 |
| Manganese | 5 |

A modification of this alloy coating may consist of the following:

| | |
|---|---|
| Nickel | 65 |
| Copper | 29 |
| Silicon | 3 |
| Manganese | 3 |

From the foregoing it will be apparent that this invention provides improvements in valves adapted for use with high pressure petroleum fluids, and particularly, a valve wherein the valve cone and its seating surface are consistently maintained in efficient relationship whereby the possibility of leakage is precluded. Furthermore, the construction of the valve is such that the opening and closing of the valve under high pressures is facilitated, at the same time allowing immediate adjustment thereof without any disturbance to the flow line. Furthermore, the provision of an alloy coating reduces the possibility of erosion or corrosion between the valve cone and seat due to the presence of acid forming fluids in the flow line.

Changes may be made in the details of the invention disclosed herein, without departing from the spirit of the invention, as expressed in the following claim.

I claim:

In a valve for high-pressure fluid lines, comprising a valve body having an axial passageway therethrough, a tapered bore in said body disposed at substantially ninety degrees to the axial passageway, a frustro-conical plug member disposed in the tapered bore, a vertical bore provided in the body and communicating with the tapered bore, an upstanding valve stem secured to the plug member and disposed in the vertical bore, said valve stem extending outwardly from the valve body and provided with an irregular-shaped end portion to provide ease of turning of the plug member, packing means surrounding the stem, a bonnet for the body, a packing nut carried by the bonnet for maintaining the packing in position, a transverse recess provided in the plug member and extending partially therethrough, a circular groove provided in the lower face of the plug member, a circular plate disposed below the plug member and having a circular groove cooperating with the first mentioned groove, a plurality of ball bearings disposed in the grooves between the bottom of the plug member and the plate, a lower cover plate secured to the body for maintaining the first mentioned plate in position, an adjustable stud member disposed in the lower cover plate providing for adjustment of the plug member in the tapered bore, a helical spring surrounding the adjustable stud for maintaining the first mentioned plate and the ball bearing race in position during adjustment of the plug member.

JIM E. LOONEY.

REFERENCES CITED

The following references are of record in the file of this patent:

UNITED STATES PATENTS

| Number | Name | Date |
| --- | --- | --- |
| 595,142 | Busse | Dec. 7, 1897 |
| 826,536 | Butterfield | July 24, 1906 |
| 1,804,711 | Smith | May 12, 1931 |
| 1,840,904 | Julien | Jan. 12, 1932 |
| 1,844,046 | Sheets | Feb. 6, 1932 |
| 2,169,194 | Geyer | Aug. 8, 1939 |

FOREIGN PATENTS

| Number | Country | Date |
| --- | --- | --- |
| 211,663 | Great Britain | of 1924 |